Patented Sept. 24, 1929

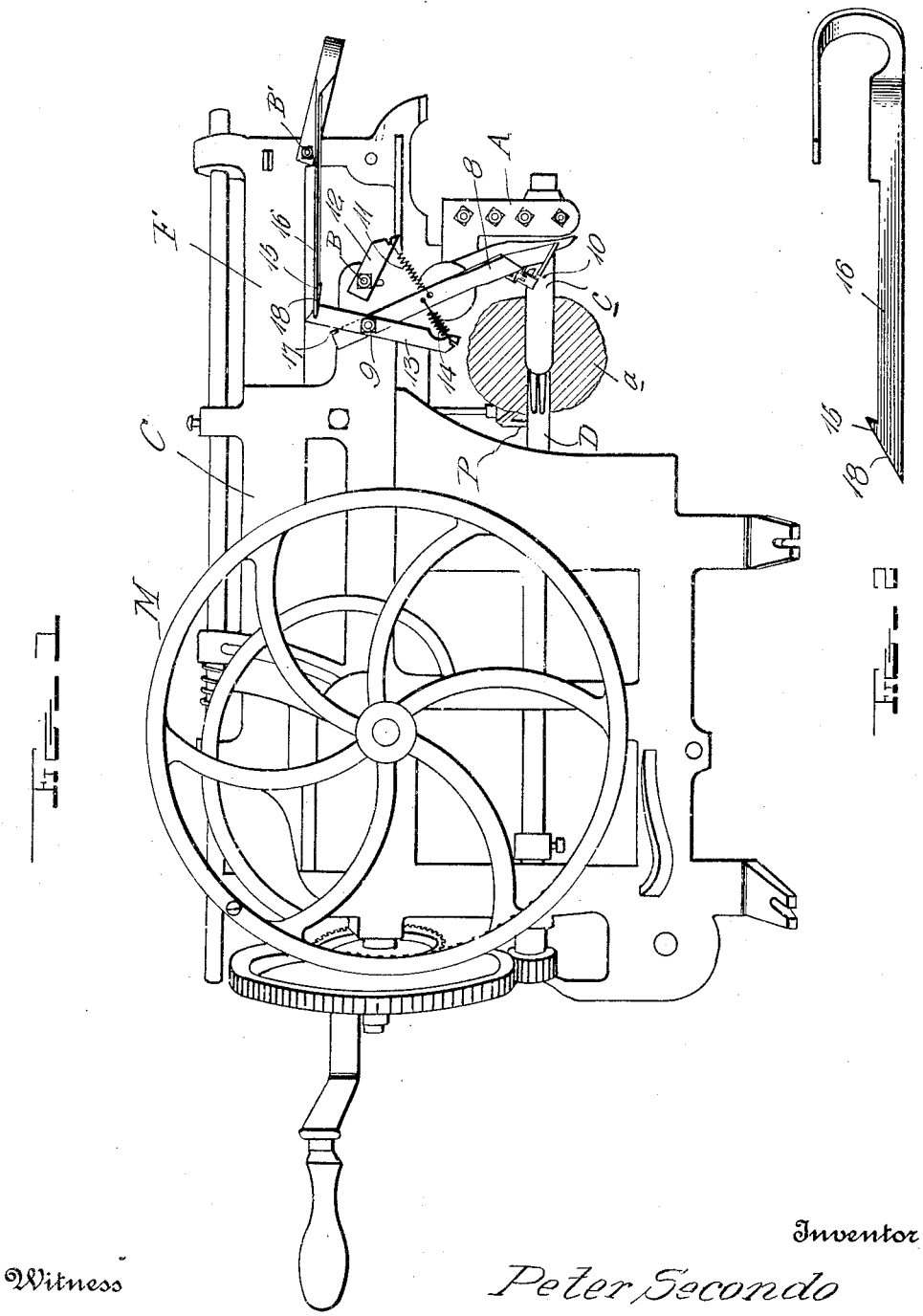

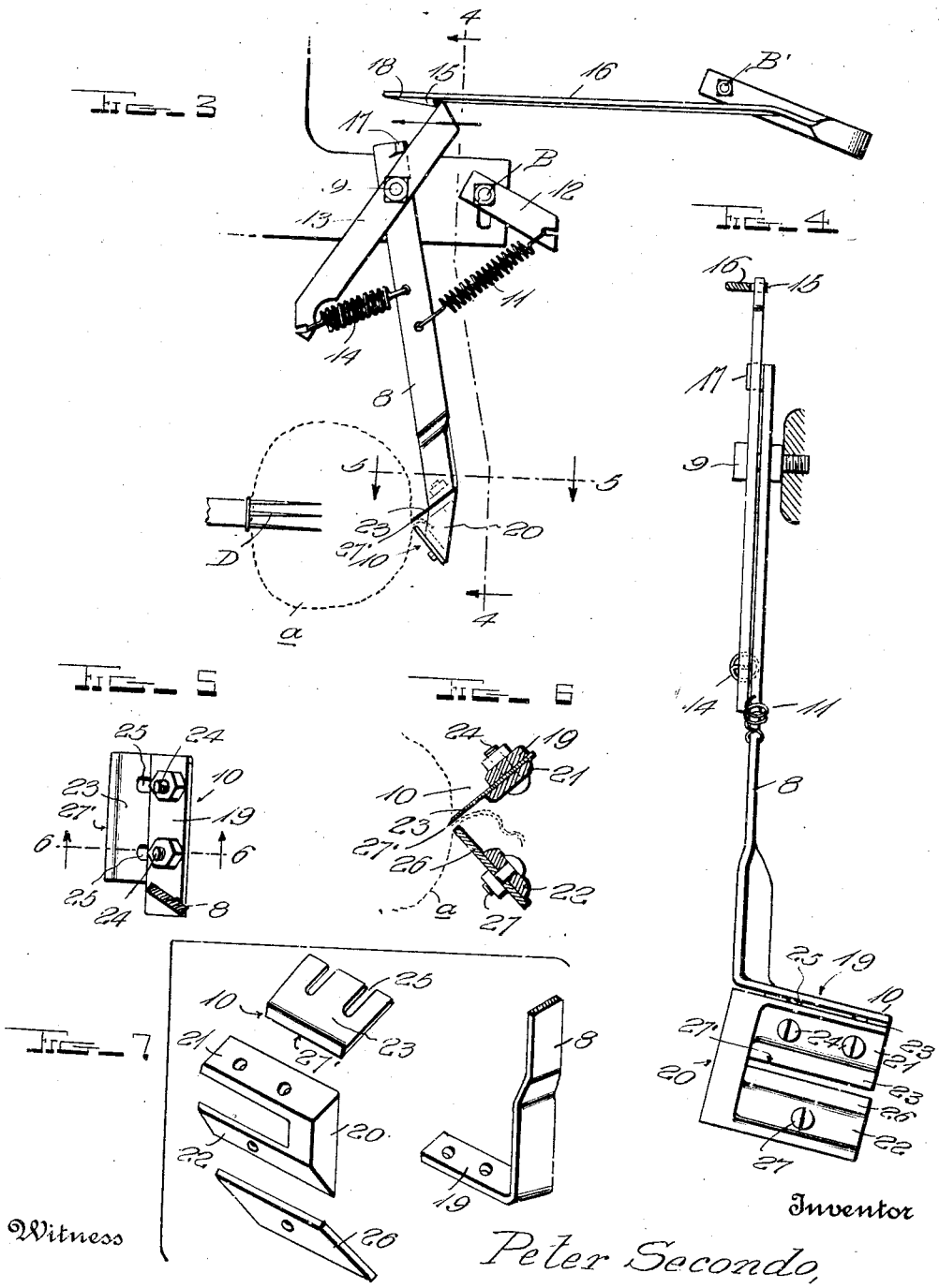

1,729,190

UNITED STATES PATENT OFFICE

PETER SECONDO, OF WATSONVILLE, CALIFORNIA

APPLE-PARING MACHINE

Application filed March 10, 1927. Serial No. 174,242.

Apple paring machines of the types now commonly in use, embody an apple driving fork, an apple corer, an apple parer and a trimmer for the end of the apple toward the driver (commonly the stem end). Such machines however leave a small ring of skin around the core hole at the other end of the apple (usually the blossom end) and it is customary to remove these rings by the use of ordinary hand manipulated knives. This entails the employment of additional labor for this task and in a large cannery or the like, means quite an appreciable expense. It is the principal aim of my invention however to improve upon apple paring machines by the production of unique means for trimming the end of the apple remote from the driver, thereby obviating the trouble and expense heretofore necessary to accomplish such trimming.

In carrying out the above end, further objects are to provide construction which may be readily mounted on the machines now in use, and to provide an exceptionally simple and inexpensive, yet an efficient and desirable construction.

With the foregoing in view, the invention resides in the novel subject matter hereinafter described and claimed, the description being supplemented by the accompanying drawings.

Fig. 1 is a side elevation of a well known form of apple paring machine embodying my improvement.

Fig. 2 is a top plane view of an actuator which is instrumental in bringing the trimmer into play.

Fig. 3 is an enlarged elevation showing the apple trimmer moved to operative position.

Fig. 4 is a vertical sectional view on line 4—4 of Fig. 3.

Fig. 5 is a horizontal section on line 5—5 of Fig. 3.

Fig. 6 is a vertical section on line 6—6 of Fig. 5.

Fig. 7 is a fragmentary perspective view showing certain parts of the trimming means disassembled.

A well known type of apple paring and coring machine M is shown, embodying a stationary frame structure F, an apple driver D mounted thereon, a carriage C slidably mounted on the frame structure, a parer P connected in the usual way with the carriage C, and a corer $c$ provided with the usual swinging arm A mounted on said carriage C.

The apple $a$ is engaged by hand with the driver D when the carriage C occupies a position to the right of that shown in Fig. 1, the corer $c$ being then in an outwardly swung, out-of-the-way position. Then, as the carriage moves toward the left (Fig. 1), the parer P comes into play and the corer $c$ penetrates the apple $a$. A trimmer (not shown) is provided for trimming the end of the apple toward the driver D, but the parer P will not trim the opposite end of the apple, close to the corer $c$, and no provision is made on most machines now in use, for attaining this end. The features of construction described below, however, insure that the small ring of skin which would otherwise remain, shall be effectively trimmed off by the machine.

In describing my improvements, I will rather specifically refer to the embodiment herein illustrated, and while the details disclosed are preferably followed, it is to be understood at the outset, that within the scope of the invention as claimed, numerous variations may be made.

The numeral 8 designates an arm which is pivoted at 9 to the carriage C, for swinging in a vertical plane longitudinally of said carriage, the lower end of said arm being provided with trimming means 10. A coiled spring 11 is connected with the arm 8 and normally holds it in an inclined position, disposing the trimming means 10 in an inoperative position. An anchor 12 has been shown for the spring 11, connected with the carriage C by one of the customary bolts B of said carriage.

Fulcrumed upon the cariage C, is a lever 13, said lever being preferably fulcrumed upon the pivot 9 of the arm 8. The lower end of this lever is connected with arm 8 by a coiled spring 14 having greater strength than the spring 11, and the upper end of lever 13 is positioned to strike a lateral shoulder or hook 15 on a suitable actuator 16 which may well be of the shape shown in Figs. 1, 2 and 3, said actuator being preferably secured to the frame F, by a bolt B' of the latter.

When the carriage occupies its extreme outward position, at which time the apple *a* is applied to the driver D, the upper end of the lever 13 occupies a position considerably to the right (Fig. 1) of the shoulder or hook 15, and the parts 8 and 13 are held in inoperative position, by the spring 11. At this time, a stop 17 on the arm 8 strikes the lever 13 and limits the swinging of the latter with respect to the former, so that its upper end will remain in proper position to later strike the shoulder or hook 15. As the carriage C now moves inwardly (toward the left in Fig. 1), the parer P and corer *c* perform their respective duties in the usual way, and during this inward travel of the carriage, the upper end of lever 13 strikes the shoulder or hook 15 of the actuator 16, as seen in Fig. 3. Thus, the lever 13 is rocked to stretch the spring 14 and impart operative strength to the latter. As soon as the strength of this spring 14 is sufficient to overcome the action of the relatively weak spring 11, said spring 14 will swing the arm 8 to bring the trimming means 10 to an operative position, in contact with the apple *a* and in substantial contact with the corer *c*, so that said trimmer will effectively remove the ring of skin left upon the apple by the parer P. By the time this trimming operation has been completed, the upper end of the lever 13 snaps out of engagement with the shoulder or hook 15 and the spring 11 then returns the parts to the normal positions shown in Fig. 1. Hence, when the carriage C moves again outwardly, the parts stand in readiness for further operation.

In the present showing, the inner end of the actuator 16 is beveled as shown more particularly at 18 in Fig. 2. During the outward movement of the carriage C, the upper end of lever 13 strikes this bevel and laterally springs the actuator 16, permitting the lever to pass the hook or shoulder 15.

The trimming means 10 is preferably of the construction shown more clearly in Figs. 4, 5, 6 and 7. From these views, it will be seen that the lower end of the arm 8 is bent laterally as denoted at 19, this laterally turned end being preferably pitched both transversely and longitudinally. Under the arm end 19, is a U-shaped frame 20 whose arms are disposed in substantially horizontal positions and are transversely pitched in converging planes. A trimming blade 23 is interposed between the upper arm 21 and the end 19 of the arm 8, and suitable clamping bolts 24 pass through these parts, the knife 23 being provided with slots 25 for adjustment. A gage plate 26 is secured by a bolt or the like 27 to the arm 22, and this gage plate and the knife 23, converge toward the cutting edge 27' of the latter, the plate being inwardly spaced from this cutting edge sufficiently to allow the desired depth of cut.

The details of the trimming means 10, just described, are not only simple and inexpensive, but are exceptionally efficient and are proof against clogging.

It will be seen from the foregoing, that distinct improvements have been made over apple paring machines of the types now commonly used, and while the improvements have been illustrated only in connection with one type of machine, operated by hand, it will be understood that said improvements, possibly with slight variances, may equally well be embodied in machines of other constructions, whether operated by hand or by power.

I claim:—

1. In an apple paring machine having a stationary frame member, an apple driver, a carriage member slidably mounted on said frame member, and an apple parer carried by the carriage; a trimmer for the end of the apple remote from the driver, means movably mounting said trimmer on one of the aforesaid members and normally holding said trimmer in an inactive position, normally inert spring means for moving said trimmer to operative position, and co-operating means on the two aforesaid members for imparting operative strength to said spring means as the carriage member travels and the apple rotates.

2. In an apple paring machine having a stationary frame member, an apple driver, a carriage member slidably mounted on said frame member, and an apple parer carried by the carriage; a trimmer for the end of the apple remote from the driver, means movably mounting said trimmer on one of the aforesaid members and normally holding said trimmer in an inactive position, normally inert spring means for moving said trimmer to operative position, a pivotally mounted element on said one member connected operatively with said spring means for imparting operative strength thereto when said element is rocked about its pivot, and an actuating element on the other of the aforesaid members for so rocking said pivoted element as said carriage member slides.

3. In an apple paring machine having a stationary frame member, an apple driver, a carriage member slidably mounted on said frame member, and an apple parer carried by the carriage; a trimming knife for the end of the apple remote from the driver, an arm carrying said knife and pivoted on one of the aforesaid members, means for normally holding said arm in one position to retain the knife in an inoperative position, a normally inert spring operatively connected to said arm, a lever operatively connected with said spring for imparting arm-swinging strength thereto, said lever being fulcrumed on said one member, and an actuating element for said lever mounted on the other of the aforesaid members for moving said lever and causing actuation of said spring and arm to dispose the knife at operative position.

4. In an apple paring machine having a stationary frame member, an apple driver, a carriage member slidably mounted on said frame member, and an apple parer carried by the carriage; a trimming knife for the end of the apple remote from the driver, an arm carrying said knife and pivoted on one of the aforesaid members, means for normally holding said arm in one position to retain the knife in an inoperative position, a lever fulcrumed on said one member and operatively connected with said arm, and an actuating element for said lever mounted on the other of the aforesaid members for moving said lever and causing movement of said arm to move the knife to operative position.

5. In a trimmer of the class described, a bar having a laterally turned end, a trimming knife contacting with the side of said end remote from the body of the bar, a U-shaped frame having its arms transversely pitched, one of said arms being disposed longitudinally of said bar end and contacting with the side of said knife remote from said end, clamping bolts passing through said bar end, said knife and said one arm, and a gauge plate secured to the other of said arms, said gauge plate and knife converging toward the cutting edge of the latter.

6. In an apple paring and coring machine having an apple driver, a movable carriage carrying an apple corer, and an apple parer also mounted on said carriage; a trimmer for the end of the apple first penetrated by the corer, means movably mounting said trimmer on the machine for movement from a normally inactive position to an operative position at which it substantially abuts said corer, and means controlled by the movement of said carriage for automatically moving said trimmer to said operative position during rotation of the apple by the aforesaid driver.

7. In an apple paring and coring machine having an apple driver, a carriage, and a parer and a corer mounted on said carriage; a trimmer for the end of the apple first penetrated by the corer, means mounting said trimmer for movement from a normally inactive position to an operative position at which it substantially abuts said corer, means controlled by the movement of said carriage for automatically moving said trimmer to said operative position, and means for later returning said trimmer automatically to said inactive position.

8. In an apple paring and coring machine having a stationary frame member, an apple driver, a carriage member mounted on said frame member, an apple parer carried by said carriage, and an apple corer also carried by the carriage; an auxiliary parer for the end of the apple remote from the driver, means movably mounting said auxiliary parer on one of the aforesaid members at one side of said corer for movement longitudinally of the latter to and from operative position, means for automatically moving said auxiliary parer to its operative position upon predetermined movement of the carriage member, and means for later automatically returning said auxiliary parer to inoperative position.

9. In an apple paring and coring machine having a stationary frame member, an apple driver thereon, a carriage member mounted on said frame member, an apple parer on said carriage member; and a corer also on said carriage member; an arm pivoted to one of said members for swinging longitudinally of the corer, said arm having a trimming device for the end of the apple remote from the driver and being also provided with an actuator, and a hook mounted on the other of said members for engagement with said actuator for swinging the arm toward the apple, holding it a predetermined time and then releasing it when the carriage member moves in one direction, said hook being movably mounted to clear said actuator when the carriage member moves in the other direction.

In testimony whereof I have hereunto affixed my signature.

PETER SECONDO.